Figure 1:
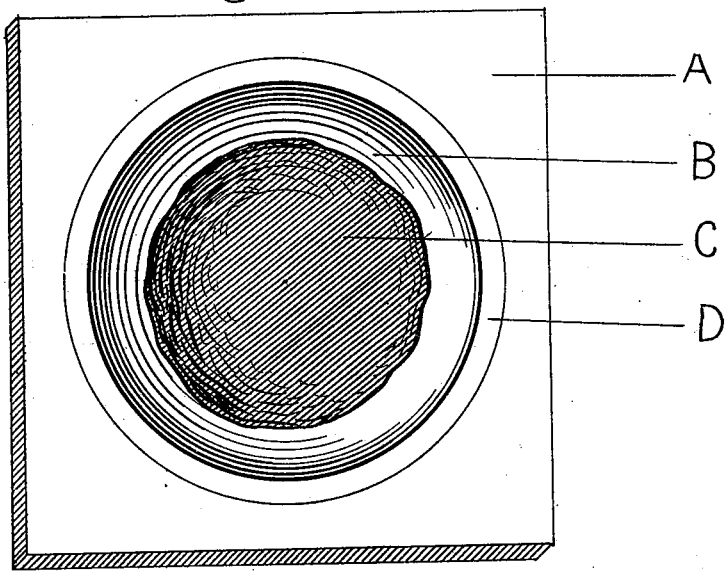

No. 627,580. Patented June 27, 1899.
J. W. HASBURG.
PACKAGE CONTAINING GOLD PAINT.
(Application filed Nov. 19, 1897.)

(No Model.)

Witnesses. Inventor.

UNITED STATES PATENT OFFICE.

JOHN W. HASBURG, OF CHICAGO, ILLINOIS.

PACKAGE CONTAINING GOLD PAINT.

SPECIFICATION forming part of Letters Patent No. 627,580, dated June 27, 1899.

Application filed November 19, 1897. Serial No. 659,207. (No specimens.)

*To all whom it may concern:*

Be it known that I, JOHN W. HASBURG, a citizen of the United States, residing at Chicago, in the county of Cook and State of Illinois, have invented new and useful Improvements in Packages Containing Gold Paint, of which the following is a specification.

My invention relates particularly to packages or receptacles in which quantities of gold paint in semisolid form are placed for storage, transportation, and delivery to users and for keeping in good condition until needed for use.

The pure gold paint to which I especially refer is such as is made from gold and is used for the decoration of the finer grades of ceramics.

The high intrinsic value and the physical and chemical nature of pure gold paint are such as to present exacting conditions which must be fulfilled in making such a package. On account of the great value of the paint the receptacle should make it possible to avoid the loss of even minute quantities through adhesion or penetration, and the materials of which the package is made should not act chemically upon the paint, and the receptacle should exclude from the paint all foreign matter, such as dust and fuzz, and the receptacle must prevent evaporation of any of the constituents of the paint. For this reason the receptacle must be hermetically sealed, and the receptacle should reliably withstand the extremes of various climatic conditions, and it should permit ready opening, and it should furnish a suitable surface upon which after opening the paint may be finally manipulated and from which it may be at once transferred to the ware to which it is to be applied, and, finally, to make the receptacle commercially operative it must meet the further condition of being such as can be cheaply manufactured and cheaply transported. These conditions are all fulfilled by my improved package.

Heretofore gold paints have been put on a glass plate and the plate inclosed in a pasteboard box. This method is objectionable, because it permits the evaporation of the volatile constituents of the oils or resins embodied in the paint, until finally the paint becomes so hard that it cannot be used. It has been sought to obviate this by the addition in manufacture of materials which will prevent drying; but this has proven unsatisfactory, one of the objections being that the non-drying materials prevent the paint from drying after it has been applied to the ware, so that it is difficult to handle without rubbing off or smudging the paint wherever it is touched, and placing the paint in an open manner upon a plate of glass exposes it to particles of foreign matter, such as dust and fuzz, which on account of the oily and sticky nature of the paint readily adhere to the latter. Such foreign matter causes imperfections in the finished work and often ruins the piece of ware to which the paint is applied. I have found through use that in my improved receptacle this paint will keep fresh and clean and without deterioration indefinitely.

My improvement is illustrated by the accompanying drawings, in which—

Figure 2:
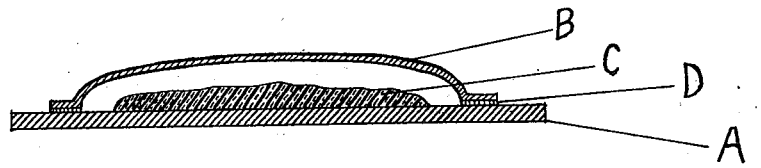

Figure 1 is a perspective view showing the receptacle in complete form. Fig. 2 is a vertical central section.

Referring to said drawings, A is the base of the receptacle. This is preferably of glass or of vitrified material. China which is glazed or vitrified will answer, and a base having the upper surface covered with a vitrified glaze or an enamel will also answer. Said base should be flat, or nearly so, as shown in the drawings.

B is the cover. This is arched or otherwise raised, so as to be definitely out of contact with the paint, and its edges D are completely sealed or fastened to the surface of the plate A, so as to form a hermetically-sealed chamber between the cover and the base. While other materials may be used, said cover is preferably made of transparent celluloid in order that the gold paint may be inspected through the same by dealers and purchasers and in order that the cover may be more readily removed without bringing the tool used in removing it into contact with the paint. Celluloid or any material not of a vitrified nature would not be a proper surface upon which to have the gold paint rest. Chemical action injurious to the paint would result from such contact; but it will be observed that there is no such contact in my package. Celluloid has the advantage of being light, and it is possible to attach it to the surface of the base A in a manner which is not deleterious to the paint. While it is light and thin and transparent, it is not fragile and will not become shattered when jarred, and during removal it does not break into pieces and deposit particles into the paint. The cover may be removed by breaking the seal with a suitable tool or by cutting the body of the cover. The cover and the base are of such a nature as to be capable of being joined to each other, so as to form a package adapted to a variety of temperatures and climatic conditions. This is an important fact, which I ascertained through extended and varied tests and experiments. In addition to meeting all other requirements the base and the cover must be mutually adapted to each other, not only at the time of manufacture, but also during the varying conditions of the future.

C is the mass of gold paint. This is ready for use. It is in a semisolid sticky state, yet sufficiently firm to prevent running. It adheres to the glass or vitrified surface sufficiently for storage and transportation, and yet this surface permits ready removal of every particle, permits no penetration, and produces no chemical action upon the paint.

It will be further observed that my package is admirably adapted as an economical and cheap container for colors or other preparations of a semisolid nature in order to protect them from exposure to particles of foreign matter and evaporation of volatile constituents and to prevent any loss of material by adhesion to the container.

I claim as my invention—

1. As an article of manufacture, a package containing gold paint, said package consisting of a base of vitrified material, a mass of semisolid gold paint adhering to one of the surfaces of said base, a cover extending over said mass of gold paint out of contact with the latter and having its edges hermetically sealed to said base, substantially as described.

2. As an article of manufacture, a package containing gold paint, said package consisting of a base of glass, a mass of semisolid gold paint adhering to one of the surfaces of said base, a cover extending over said mass of gold paint out of contact with the latter and having its edges hermetically sealed to said base, substantially as described.

3. As an article of manufacture, a package containing a preparation of a semisolid nature, said package consisting of a base of glass, a semisolid preparation adhering to one of the surfaces of said base, a cover extending over said semisolid preparation out of contact with the latter and having its edges hermetically sealed to said base, substantially as described.

JOHN W. HASBURG.

Witnesses:
CHAS. P. LEBAAD,
D. J. POWERS.